US 008619500B2

(12) United States Patent
Gray

(10) Patent No.: US 8,619,500 B2
(45) Date of Patent: Dec. 31, 2013

(54) METHODS AND SYSTEMS FOR ESTIMATING STRESS USING SEISMIC DATA

(76) Inventor: Frederick D. Gray, Calgary (CA)

( * ) Notice: Subject to any disclaimer, the term of this patent is extended or adjusted under 35 U.S.C. 154(b) by 339 days.

(21) Appl. No.: 13/012,110

(22) Filed: Jan. 24, 2011

(65) Prior Publication Data

US 2011/0182144 A1    Jul. 28, 2011

Related U.S. Application Data

(60) Provisional application No. 61/298,098, filed on Jan. 25, 2010.

(51) Int. Cl.
*G01V 1/30* (2006.01)
*G01V 1/48* (2006.01)

(52) U.S. Cl.
USPC ............................................. 367/75; 702/11

(58) Field of Classification Search
USPC ........................ 367/75; 73/152.59; 702/11, 18
See application file for complete search history.

(56) References Cited

U.S. PATENT DOCUMENTS

| 7,006,918 | B2 * | 2/2006 | Economides et al. ............ 702/1 |
| 7,066,019 | B1 * | 6/2006 | Papanastasiou ........... 73/152.59 |
| 2006/0131074 | A1 * | 6/2006 | Calhoun et al. ................. 175/50 |
| 2007/0118292 | A1 * | 5/2007 | Moos .............................. 702/14 |
| 2008/0071505 | A1 * | 3/2008 | Huang et al. ....................... 703/2 |
| 2009/0164128 | A1 * | 6/2009 | Tchakarov et al. ............. 702/11 |
| 2009/0164129 | A1 * | 6/2009 | Sayers ............................ 702/11 |

FOREIGN PATENT DOCUMENTS

WO    01/94982 A2    12/2001

OTHER PUBLICATIONS

International Search Report mailed on Mar. 21, 2011 in corresponding International Application No. PCT/US2011/022265.
Written Opinion of the International Searching Authority mailed on Mar. 21, 2011 in corresponding International Application No. PCT/US2011/022265.
Combined Search and Examination Report under Section 17 and 18(3) issued in corresponding Application No. GB-1101298.6, issued on May 4, 2011.
F.D. Gray et al., "Optimize Shale Gas Field Development Using Stresses and Rock Strength Derived From 3D Seismic Data" CSUG Canadian Society for Unconventional Gas, Calgary, Alberta, Canada 19-21 Oct. 10-21, 2010.

* cited by examiner

*Primary Examiner* — Isam Alsomiri
*Assistant Examiner* — Hovhannes Baghdasaryan
(74) *Attorney, Agent, or Firm* — Patent Portfolio Builders PLLC

(57) ABSTRACT

A method for estimating principal stresses of a subterranean formation from seismic data. In one embodiment, rock strength parameters from seismic data of the formation is first determined to calculate the anisotropic elastic properties of the formation. The three principal stresses of the formation: vertical stress, minimum horizontal stress, and maximum horizontal stress, is determined using at least the calculated anisotropic elastic properties and the rock strength parameters of the formation. From the estimated principal stresses, the differential ratio of the maximum and minimum horizontal stresses can be determined to indicate optimal zones for hydraulic fracturing. In another embodiment, a tectonic strain term is introduced to calibrate the estimated principal estimated stress to a known reference point. In yet another embodiment, hoop stress is incorporated to estimate the fracture initiation pressures.

16 Claims, 8 Drawing Sheets

METHODS AND SYSTEMS FOR ESTIMATING STRESS USING SEISMIC DATA

CROSS-REFERENCE TO RELATED APPLICATIONS

The present application claims priority to U.S. Application No. 61/298,098, which was filed on Jan. 25, 2010, the disclosure of which is incorporated by reference.

TECHNICAL FIELD

The present disclosure relates generally to geophysics and, in particular, methods and systems estimating stress and rock strength parameters. More specifically, the present disclosure concerns the use of anisotropic analysis of 3D seismic data to estimate the principal stresses and rock strength parameters, thereby optimizing the placement and direction of wells and hydraulic fracture operations.

BACKGROUND OF THE INVENTION

Generally, in the field of oil and gas exploration and recovery, analysis of seismic data obtained through seismic surveys can provide crucial physical parameters of subterranean rock formations. Conventional surface seismic surveys record compressional, or P-waves. Multicomponent seismic surveys record both P-waves and shear, or S-waves. Seismic data processing methods include azimuthal velocity correction and amplitude versus offset (AVO) analysis and inversion, amplitude versus offset and azimuth (AVOA or AVAZ—Amplitude Versus Angle and aZimuth) analysis and inversion of conventional three dimensional (3D) seismic data, and birefringence analysis of multicomponent 3D seismic data. The analyzed seismic data can provide useful information regarding the characteristics and parameters of the subterranean formation such as rock strength: Young's modulus and Poisson's ratio, and in-situ principal stress directions and magnitudes: one vertical stress, $\sigma_v$, and two horizontal stresses, $\sigma_{Hmax}$ and $\sigma_{hmin}$. Further, seismic detection of subsurface fractures has important applications in the study of unconventional rock formations such as shale plays, tight gas sands and coal bed methane, as well as carbonates, where the subterranean formations are naturally fractured reservoirs.

Information concerning these characteristics and parameters are often essential in a variety of fields such as underground transportation systems, foundations of major structures, cavities for storage of liquids, gases or solids, and in prediction of earthquakes. In oil and gas exploration, the information is important for determining optimal locations and orientations of vertical, inclined, and horizontal wells, minimizing wellbore instability, and formation break-out. Also, these characteristics are crucial to optimize the operating parameters of a commonly utilized technique for stimulating the production of hydrocarbons by applying hydraulic pressure on the formation from the wellbore.

Conventionally, the rock strength parameters and in-situ principal stress magnitudes have been obtained by testing the core samples and these physical parameters have been calculated by testing the core samples, which are extracted from an oil or gas well in a manner known in the art, by applying forces to core samples and measure responses to such forces. In-situ stress directions have been assumed to be equal to the direction of the regional stress field, determined either from nearby borehole ellipticity or from the "World Stress Map," which is a global database of recent tectonic stress in the Earth's crust. The database is an open-access database and is available through various sources.

These methods, however, fail to consider large-scale vertical fracturing and lateral variations in such fracturing within the subterranean formation. The preferential orientation of the vertical fracture networks, in conjunction with the present-day subterranean stress field, causes the formation to be an azimuthally anisotropic medium with respect to seismic wave propagation in seismic surveys, thereby affecting seismic amplitude and velocity. Wide patch or wide azimuth recording in which a wave velocity changes with direction of propagation has frequently been used to acquire 3D seismic data on land. Offset distribution and azimuth sampling in such recordings have not been a priority. As such, the resulting offset and azimuth sampling is often inadequate for reliable measurement of crucial azimuthally variations.

In addition, these methods known in the art for estimating the necessary rock strength parameters and in-situ principal stress directions yield results that do not match the field measurements of in-situ stress. Further, the results from these known methods are spatially restricted, meaning the models are localized to only the area where the data was gathered. Thus, the models produced by these known methods would be inaccurate and unreliable for unconventional rock formations such as shale plays, where the rock strength and stress can vary significantly over a few hundred meters.

Although various data analysis methods that consider the anisotropy characteristics, such as AVO, LMR, joint and simultaneous inversion, and multicomponent analysis, have been employed to estimate the rock strength parameters from seismic data, these have not previously been used to estimate the three principal stresses. For instance, the disclosure in Goodway et al., 2006, "Practical applications of P-wave AVO for unconventional gas Resource Plays—I: Seismic petrophysics and isotropic AVO" CSEG Recorder, pp. 90-95 suggests a method of estimating closure stress, based on an equation by Warpinski. Closure stress is generally thought to be equal to the minimum horizontal stress, which is only one of the three principle stresses estimated by this invention. The current invention is substantially different from that of Goodway in that it estimates all three principal stresses, rather than just the closure stress. Furthermore, the present invention provides for a new and innovative way of estimating the principal stresses by modifying the concepts of Iverson, W. P., 1995, "Closure Stress Calculations in Anisotropic Formations" SPE Paper 29598 (hereinafter "Iverson") to incorporate anisotropic elastic properties derived from Schoenberg, M. and Sayers, C. M., 1995, "Seismic anisotropy of fractured rock" Geophysics, 60, 1, pp. 204-211 (hereinafter "Schoenberg and Sayers"), rather than merely estimating closure stress using Warpinski.

In addition, while azimuthal AVO analysis has been used in structural interpretation such as to identify the presence of fractures between well locations, the reliability of this method is limited to situations where the seismic anisotropy is caused by fluid-filled fractures, there is a single dominant fracture set, the fracture set is near vertical, and the fractures are connected. Further, the azimuthal AVO method does not provide for a simple way to estimate the principal stresses from seismic data. Another known method, multicomponent fracture analysis, similarly does not provide for a simple estimation of the principal stresses, which are crucial in the oil and gas exploration and development.

The novel approach of the present invention overcomes these problems associated with methods known in the art. For example, the present invention estimates the in-situ principal stresses from anisotropic elastic properties of the subterranean formation, which are derived from seismic data through the use of the linear slip theory. As such, the principal stresses can be estimated from seismic data. Further, the present invention can be used to estimate density between wells that allow for the calculation of vertical stress, $\sigma_v$, between wellbores. Furthermore, the present invention allows for calculation of a Differential Horizontal Stress Ratio (DHSR), where $$DHSR = \left(\frac{\sigma_{H\,max} - \sigma_{h\,min}}{\sigma_{H\,min}}\right),$$

from the seismic parameters alone, without any knowledge of the stress state of the subterranean formation. That is, the present invention allows for identification of the areas that will be optimal for hydraulic fracture stimulations without the need to know the vertical stress.

In addition, the present invention also provides a simple relationship between horizontal stresses, $\sigma_{Hmax}$ and $\sigma_{hmin}$, and vertical stress, $\sigma_v$, such that they can be easily calculated from the results of seismic simultaneous or joint inversion and azimuthal AVO inversion. Also, the present invention allows for the calibration of the horizontal stresses, $\sigma_{Hmax}$ and $\sigma_{hmin}$, to a known reference point by introducing a tectonic stress term. Furthermore, known methods of estimating the vertical, or overburden stress, often use well logs that are almost never acquired all the way to the surface. The present invention allows an improved estimate of the vertical, or overburden stress, by using simultaneous or joint AVO inversion of prestack seismic data, which can provide density values all the way to the surface and can incorporate surface topography.

In view of the drawbacks of methods known in the art for determining in-situ principal stresses and rock strength, there is a great need for reliable and accurate estimation and dynamic modeling of the rock strengths and principal stresses of subterranean formations. The present disclosure provides for methods and systems that produce reliable estimates of principal stresses, particularly for large areas between wellbores, from well known extraction techniques of seismic data.

BRIEF SUMMARY OF THE INVENTION

Embodiments of the present invention provide enhanced systems and methods for estimating principal stresses of a subterranean formation using seismic data. According to certain embodiments of the present invention, the rock strength parameters are derived from seismic data of the formation; the anisotropic elastic properties of the formation is calculated based at least on the derived rock strength parameters; and from the calculated anisotropic elastic properties and the derived rock strength parameters of the formation, the principal stresses of the formation can be determined. The principal stresses of a formation are the vertical stress, the minimum horizontal stress, and the maximum horizontal stress.

In one example, the vertical stress is determined by integrating a density log derived from seismic inversion. The minimum horizontal stress is determined by a relation $$\sigma_x = \sigma_z \frac{\nu(1+\nu)}{1+EZ_N-\nu^2}$$

between the vertical stress $\sigma_z$, Young's modulus E, Poisson's ratio $\nu$, and normal fracture compliance $Z_N$. And the maximum horizontal stress is determined by a relation $$\sigma_y = \sigma_z \nu \left(\frac{1+EZ_N+\nu}{1+EZ_N-\nu^2}\right)$$

between the vertical stress $\sigma_z$, Young's modulus E, Poisson's ratio $\nu$, and normal compliance $Z_N$.

Embodiments of the present invention have recognized that the determined principal stresses can be used to calculate a differential ratio of the maximum and minimum horizontal stresses (DHSR) to identify one or more optimal areas of a subterranean formation for hydraulic fracturing.

Additionally, other embodiments enable for the calibration of the estimated principal stresses. In one example, the determined minimum horizontal stress and maximum horizontal stress are calibrated to a known reference point by adding a tectonic stress constant, where the tectonic stress constant is derived from in-situ stress logs of the reference point. Alternatively, the minimum and maximum horizontal stresses are calibrated by including a tectonic strain term and a overburden stress term in the determination of the principal stresses. In another example, hoop stress is incorporated in the calculation of the principal stresses to estimate the pressure required to initiate one or more fractures on the sides of a borehole.

According to certain embodiments of the present invention, an enhanced seismic data processing system is operable to receive seismic data of a subterranean formation and process the received seismic data to determine the rock strength parameters, calculate the anisotropic elastic properties of the formation using at least the determined rock strength parameters; and determine the principal stresses of the formation from at least the calculated anisotropic elastic properties and the rock strength parameters of the formation.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The present disclosure is directed to a method for determining the stress from seismic data, such as conventional 3D seismic data and multi-component seismic data. In accordance with this invention, the necessary rock strength parameters of Young's modulus and Poisson's ratio can be obtained from either seismic amplitude inversion of multicomponent, 3D seismic data or of conventional 3D seismic data. Poisson's ratio is the relationship of longitudinal to lateral strains, and Young's modulus is the elastic deformation according to Hooke's law. The use of these parameters are described below.

Further, the various embodiments of the present invention can be implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

In addition, a brief discussion of the mathematical and theoretical concepts behind the embodiments of the present invention may prove beneficial and are presented below. As mentioned above, in field measurements of in-situ stress, closure stress is the pressure at which the induced hydraulic fracture closes, and it is assumed to be equal to the minimum horizontal stress. As used herein, the minimum horizontal stress can be expressed as $\sigma_{hmin}$ or $\sigma_x$, the maximum horizontal stress can be expressed as $\sigma_{Hmax}$ or $\sigma_y$, and the vertical stress can be expressed as $\sigma_v$ or $\sigma_z$. Also, the following isotropic elastic parameters of strains, stress, Poisson's ratio and Young's modulus are defined below:

$\epsilon_x$ and $\epsilon_y$ are horizontal strains,
$\epsilon_z$ is vertical strain
$\sigma_x$ and $\sigma_y$ are horizontal stresses
$\sigma_z$ is vertical stress $$\nu = \text{Poisson's ratio} = \frac{\varepsilon_x}{\varepsilon_z} = \frac{\varepsilon_x}{\varepsilon_y}$$

$$E = \text{Young's modulus} = \frac{\sigma_x}{\varepsilon_x} = \frac{\sigma_y}{\varepsilon_y} = \frac{\sigma_z}{\varepsilon_z}$$

Figure 1:
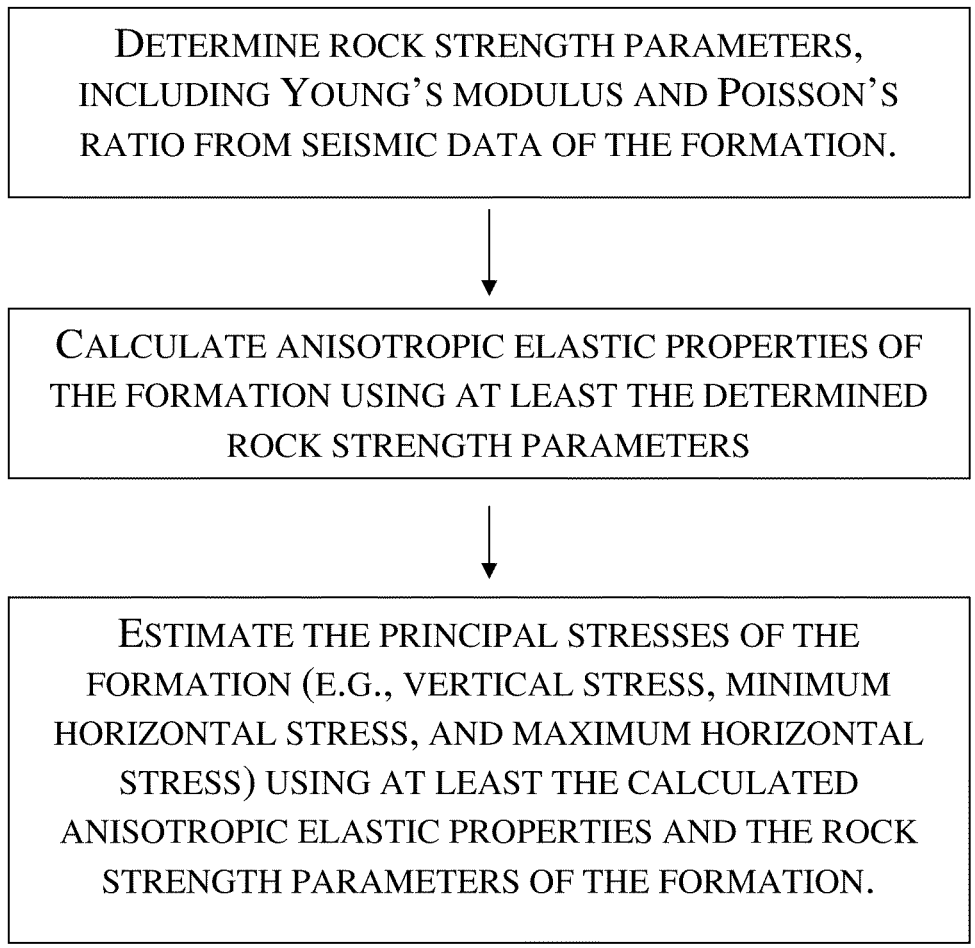
FIG. 1 is a flow chart of a first embodiment of a method for estimating the principal stresses in accordance with the present invention.

FIG. 1 illustrates a first embodiment of a method for estimating principal stresses of a subterranean formation. In estimating the principal stresses from seismic data, the present invention recognizes that there are seismic terms involved in Hooke's law, which represents a fundamental relationship relating elastic strain to stress, which governs hydraulic fracturing, i.e., the deformation (strain) and fracturing of rock is caused by stressing it with hydraulic pressure. The relationship between stress and strain is controlled by the elastic properties of the rock. When working with a three-dimensional stress state, the generalized form of Hooke's law can be inverted to obtain a relation for the strain, $\epsilon$, in terms of stress, $\sigma$. That is, the strain, $\epsilon$, on a subterranean formation is a function of its stress, $\sigma$, times its effective elastic compliance tensor S:

$$\epsilon_{ij} = S_{ijkl}\sigma_{kl} \text{ with } i,j,k,l \in 1,2,3 \tag{1}$$

where:
$\epsilon$: the strain on a fractured subterranean formation
$\sigma$: stress experienced by the formation
S: the effective compliance of the formation Using conventional (2-subscript) condensed 6×6 matrix notation, equation (1) can be expressed as $$\epsilon_i = S_{ij}\sigma_j \text{ with } i,j \in 1, 2, \ldots, 6 \tag{2}$$

where: 11→1, 22→2, 33→3, 23→4, 13→5 and 12→6.

According to the linear slip theory of Schoenberg and Sayers for including the anisotropic effects on seismic propagation through fractured subterranean formation, the effective compliance tensor of the fractured subterranean formation can be written as the sum of the compliance tensor of the unfractured background material, $S_b$, and the excess compliance tensor, $S_f$, due to the presence of vertical fractures or micro-fractures in this background. The background compliance tensor, $S_b$, is the compliance of an isotropic background material. The excess compliance tensor, $S_f$, considers each set of parallel or aligned fractures. According to Schoenberg and Sayers, the effective elastic compliance tensor of the formation, S, can be written as $$S = S_b + S_f \tag{3}$$

where
S: the effective compliance of the fractured formation
$S_b$: the background compliance
$S_f$: the excess fracture compliance Therefore, using the Linear Slip theory of Schoenberg and Sayers, the compliance matrix can be simplified to $S_b + S_f$ and Hooke's law can be simplified as follows $$\epsilon_{i,j} = \{S_b + S_f\}\sigma_j \text{ with } i,j \in 1, 2, \ldots, 6 \tag{4}$$

where: 11→1, 22→2, 33→3, 23→4, 13→5 and 12→6

Pursuant to Schoenberg and Sayers, the excess fracture compliance, $S_f$, can be written as $$S_f = \begin{bmatrix} Z_N & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & Z_T & 0 \\ 0 & 0 & 0 & 0 & 0 & Z_T \end{bmatrix} \tag{5}$$

where $Z_N$: the compliance normal to the fracture face or plane $Z_T$: the compliance tangential to the fracture face or plane.

Under the Linear Slip theory, the fractures are assumed to be invariant with respect to rotation about an axis normal to the fracture plane and the background is isotropic. Thus, by letting the normal compliance of the fractures be given by $Z_N$ and the tangential compliance by $Z_T$, the overall compliance tensor depends on only these two fracture compliances tensors, $Z_N$ and $Z_T$.

The background compliance, $S_b$, or compliance tensor for an isotropic background material can be expressed in terms of Young's modulus and Poisson's ratio as $$S_b = \begin{bmatrix} \frac{1}{E} & \frac{-\nu}{E} & \frac{-\nu}{E} & 0 & 0 & 0 \\ \frac{-\nu}{E} & \frac{1}{E} & \frac{-\nu}{E} & 0 & 0 & 0 \\ \frac{-\nu}{E} & \frac{-\nu}{E} & \frac{1}{E} & 0 & 0 & 0 \\ 0 & 0 & 0 & \frac{1}{\mu} & 0 & 0 \\ 0 & 0 & 0 & 0 & \frac{1}{\mu} & 0 \\ 0 & 0 & 0 & 0 & 0 & \frac{1}{\mu} \end{bmatrix} \quad (6)$$

where
E: Young's modulus of the background material
ν: Poisson's ratio of the background material
μ: the shear (rigidity) modulus of the background material The effective compliance matrix for a single set of rotationally invariant fractures in an isotropic background medium is the sum of the background compliance matrix and the excess compliance matrix. In other embodiments, the background media can be vertical transverse isotropy (VTI) or some lower symmetry. The effective compliance matrix is composed of terms that can be derived from seismic data using the methods described above and can be written as $$S = S_b + S_f = \begin{bmatrix} \frac{1}{E}+Z_N & \frac{-\nu}{E} & \frac{-\nu}{E} & 0 & 0 & 0 \\ \frac{-\nu}{E} & \frac{1}{E} & \frac{-\nu}{E} & 0 & 0 & 0 \\ \frac{-\nu}{E} & \frac{-\nu}{E} & \frac{1}{E} & 0 & 0 & 0 \\ 0 & 0 & 0 & \frac{1}{\mu} & 0 & 0 \\ 0 & 0 & 0 & 0 & \frac{1}{\mu}+Z_T & 0 \\ 0 & 0 & 0 & 0 & 0 & \frac{1}{\mu}+Z_T \end{bmatrix} \quad (7)$$

As mentioned above, the Linear Slip theory assumes a "single set of rotationally invariant fractures in an isotropic background material, the medium is transversely isotropic (TI) with its symmetry axis perpendicular to the fractures." In other words, the formation is modeled as transverse isotropy with a horizontal axis of symmetry (HTI), or azimuthal anisotropy. More complex models of anisotropy can also be used to determine these parameters if sufficient and suitable data for the determination of its elastic parameters is available. In other words, the matrix of equation (2) representing Hooke's law can be written as $$\begin{bmatrix} \varepsilon_1 \\ \varepsilon_2 \\ \varepsilon_3 \\ \varepsilon_4 \\ \varepsilon_5 \\ \varepsilon_6 \end{bmatrix} = \begin{bmatrix} \frac{1}{E}+Z_N & \frac{-\nu}{E} & \frac{-\nu}{E} & 0 & 0 & 0 \\ \frac{-\nu}{E} & \frac{1}{E} & \frac{-\nu}{E} & 0 & 0 & 0 \\ \frac{-\nu}{E} & \frac{-\nu}{E} & \frac{1}{E} & 0 & 0 & 0 \\ 0 & 0 & 0 & \frac{1}{\mu} & 0 & 0 \\ 0 & 0 & 0 & 0 & \frac{1}{\mu}+Z_T & 0 \\ 0 & 0 & 0 & 0 & 0 & \frac{1}{\mu}+Z_T \end{bmatrix} \begin{bmatrix} \sigma_1 \\ \sigma_2 \\ \sigma_3 \\ \sigma_4 \\ \sigma_5 \\ \sigma_6 \end{bmatrix} \quad (8)$$

In working with a three-dimensional stress state, the stiffness tensor, C, must be defined to link the stress tensor, σ, and the strain tensor, ε.

$$\sigma_j = C_{ij}\varepsilon_i \text{ with } i,j \in 1, 2, \ldots, 6 \quad (9)$$

where:
ε: the strain on a fractured subterranean formation
σ: stress experienced by the formation
C: the stiffness of the formation Further, the following equation represents the relationship between the stiffness matrix, C, and the compliance matrix, S.

$$C = S^{-1} \quad (10)$$

Thus, the stiffness matrix, C, can be derived from the compliance matrix, S, by taking the inverse of equation (7). According to Schoenberg and Sayers, the inverse of the compliance matrix can be written as $$C = S^{-1} = \begin{bmatrix} M(1-\Delta_N) & \lambda(1-\Delta_N) & \lambda(1-\Delta_N) & 0 & 0 & 0 \\ \lambda(1-\Delta_N) & M(1-r^2\Delta_N) & \lambda(1-\Delta_N) & 0 & 0 & 0 \\ \lambda(1-\Delta_N) & \lambda(1-\Delta_N) & M(1-r^2\Delta_N) & 0 & 0 & 0 \\ 0 & 0 & 0 & \mu & 0 & 0 \\ 0 & 0 & 0 & 0 & \mu(1-\Delta_T) & 0 \\ 0 & 0 & 0 & 0 & 0 & \mu(1-\Delta_T) \end{bmatrix} \quad (11)$$

where $$M = \lambda + 2\mu$$

$$r = \frac{\lambda}{M}$$

$$0 \leq \Delta_T = \frac{\mu Z_T}{1+\mu Z_T} < 1$$

$$0 \leq \Delta_N = \frac{M Z_N}{1+M Z_N} < 1$$

-continued $$Z_T = \frac{\Delta_T}{\mu(1-\Delta_T)}$$

$$Z_N = \frac{\Delta_N}{M(1-\Delta_N)}$$

$\Delta_N$ = normal weakness $\Delta_T$ = tangential weakness

In one embodiment, $\Delta_N$ is estimated by azimuthal simultaneous elastic inversion, as disclosed by U.S. Application Nos. 61/313,394 and 61/340,096, entitled METHODS AND SYSTEMS FOR PERFORMING AZIMUTHAL SIMULTANEOUS ELASTIC INVERSION and filed on Mar. 12, 2010, the disclosures of which are incorporated by reference. In particular, the inputs to the azimuthal simultaneous elastic inversion algorithm are angle stacks, i.e., angle of incidence and azimuthal angle, and some initial layered elastic model defined in the time domain. By using angle stacks, NMO (normal-moveout) stretch, disclosed by Roy, B., Anno, P., Baumel R., Durrani, J., 2005, "Analytic Correction for Wavelet Stretch due to Imaging," SEG Convention, AVO 2.1, 234-237, and scaling issues can be addressed by varying the wavelet as a function of angle of incidence and/or of azimuth. Further, ray tracing need not be performed, simplifying the forward modeling. Typically, the reflection coefficients are used to estimate the wavelet phase and frequency. The simultaneous inversion algorithm takes multiple angle-stacked, i.e., angle of incidence and azimuthal angle, seismic data sets and generates elastic parameter volumes as outputs: P-impedance, S-impedance, density, and anisotropic properties. In addition, the elastic parameters can be constrained according to rock physics relationships. The forward modeling component of the present invention calculates the reflectivity using the anisotropic Zoeppritz equation or some linearization of this to reflect the properties of anisotropic media.

As discussed above, given the relationship provided by equation (9), the stress experienced by the formation can be written in terms of the stiffness matrix, C, as the following $$\begin{bmatrix} \sigma_1 \\ \sigma_2 \\ \sigma_3 \\ \sigma_4 \\ \sigma_5 \\ \sigma_6 \end{bmatrix} = \begin{bmatrix} M(1-\Delta_N) & \lambda(1-\Delta_N) & \lambda(1-\Delta_N) & 0 & 0 & 0 \\ \lambda(1-\Delta_N) & M(1-r^2\Delta_N) & \lambda(1-\Delta_N) & 0 & 0 & 0 \\ \lambda(1-\Delta_N) & \lambda(1-\Delta_N) & M(1-r^2\Delta_N) & 0 & 0 & 0 \\ 0 & 0 & 0 & \mu & 0 & 0 \\ 0 & 0 & 0 & 0 & \mu(1-\Delta_T) & 0 \\ 0 & 0 & 0 & 0 & 0 & \mu(1-\Delta_T) \end{bmatrix} \begin{bmatrix} \varepsilon_1 \\ \varepsilon_2 \\ \varepsilon_3 \\ \varepsilon_4 \\ \varepsilon_5 \\ \varepsilon_6 \end{bmatrix}$$

Further, according to Iverson, the horizontal stresses, $\sigma_x$ and $\sigma_y$, are related to the vertical stress, $\sigma_y$, by the following equations $$\sigma_x = \sigma_z \frac{E_x}{E_z} \left[ \frac{v_{yz} v_{xy} + v_{xz}}{1 - v_{xy} v_x} \right] \quad (12)$$

and $$\sigma_y = \sigma_z \frac{E_y}{E_z} \left[ \frac{v_{xz} v_{yx} + v_{yz}}{1 - v_{xy} v_x} \right] \quad (13)$$

Where:

$v_{xy} = \epsilon_x/\epsilon_y$, $v_{xz} = \epsilon_x/\epsilon_z$, $v_{yz} = \epsilon_y/\epsilon_z$, and $v_{yx} = \epsilon_y/\epsilon_x$ $E_x = \sigma_x/\epsilon_x$, $E_y = \sigma_y/\epsilon_y$, and $E_z = \sigma_z/\epsilon_z$ Further, the strains $\epsilon_i$ can be calculated from the matrix (8). For instance, the strain in the horizontal x direction can be written as $$\varepsilon_x = \varepsilon_1 = \left(\frac{1}{E} + Z_N\right)\sigma_x - \frac{v}{E}(\sigma_y + \sigma_z) \quad (14)$$

and $$\varepsilon_y = \varepsilon_z = \frac{1}{E}\sigma_y - \frac{v}{E}(\sigma_x + \sigma_z) \quad (15)$$

Iverson represents the amount of strain in the horizontal x-direction as $\epsilon_1$—the strain due to vertical stress z through Poisson's relationship, $\epsilon_2$—the strain due in the horizontal y-direction stress through Poisson's relationship, and $\epsilon_3$—the strain due to the horizontal x-direction stress and Hooke's law. The three components of the strain in the horizontal x-direction are written as $$\varepsilon_x = \varepsilon_1 + \varepsilon_2 + \varepsilon_3 \quad (16)$$

$$\varepsilon_x = v\frac{\sigma_z}{E} + v\frac{\sigma_y}{E} + v\frac{\sigma_x}{E} \quad (17)$$

By including the anisotropic rock properties as disclosed by Iverson, meaning the horizontal stresses are not assumed to be equal, and assuming that the subterranean rocks are bound, i.e., they are not moving, then all the strains ($\epsilon_x, \epsilon_y, \epsilon_z$) are equaled to zero, the anisotropic form of equation (16) is written as $$\varepsilon_x = v_{xz}\frac{\sigma_z}{E_z} + v_{xy}\frac{\sigma_y}{E_y} - \frac{\sigma_x}{E_x} = 0 \quad (18)$$

Pursuant to Iverson, solving equation (18) for $\sigma_y$, and substituting into the equivalent formula for strain in the y direction yields the following equation $$\varepsilon_y = v_{yz}\frac{\sigma_z}{E_z} + v_{yx}\frac{\sigma_x}{E_x} - \frac{\sigma_y}{E_y} = 0 \quad (19)$$

As seen, equation (14) is the equivalent of equation (18) and equation (15) is the equivalent of equation (19). Therefore, using Schoenberg and Sayers notation and the assumption of an HTI medium, the relationship between Poisson's ratio and Young's modulus of Iverson, by comparison, can be represented as $$v_{xz} = v_{xy} = v, E_z = E \quad (20)$$

and $$\frac{1}{E_x} = \frac{1}{E} + Z_N \text{ or } E_x = \frac{E}{EZ_N + 1} \quad (21)$$

and $$v_{yz} = v_{yx} = v, E_y = E \quad (22)$$

That is, each term of Iverson's equation (18) can be compared to its equivalent in equation (14), which uses the notations and assumptions from Schoenberg and Sayers. Therefore, the present invention provides for a novel, innovative, and nonobvious way to incorporate Schoenberg and Sayers and Iverson. For example, $$v_{xz}\frac{\sigma_z}{E_z} = \frac{v}{E}\sigma_z \text{ or } \frac{v_{xz}}{E_z} = \frac{v}{E}$$

Therefore, given the above, equation (18) can be written as $$v\frac{\sigma_z}{E} + v\frac{\sigma_y}{E} - \sigma_x\left(\frac{1}{E} + Z_N\right) = 0 \quad (23)$$

so $$\sigma_x = \frac{\frac{v}{E}(\sigma_y + \sigma_z)}{\frac{1}{E} + Z_N} = (\sigma_y + \sigma_z)\frac{v}{1 + EZ_N} \quad (24)$$

Similarly, Schoenberg and Sayers notations and assumption can be applied to Iverson's equation (19) for the horizontal stress in the y direction, which can be represented as $$\sigma_y = (\sigma_x + \sigma_z)v \quad (25)$$

Equation (24) can be solved for $\sigma_x$ in terms of $\sigma_z$ by substituting $\sigma_y$ from equation (25)

$$\sigma_x = \sigma_z\frac{v(1+v)}{1 + EZ_N - v^2} \quad (26)$$

Likewise, equation (25) can be solved for $\sigma_y$ in terms of $\sigma_z$ by substituting $\sigma_x$ from equation (24)

$$\sigma_y = \sigma_z v\left(\frac{1 + EZ_N + v}{1 + EZ_N - v^2}\right) \quad (27)$$

Figure 2A:
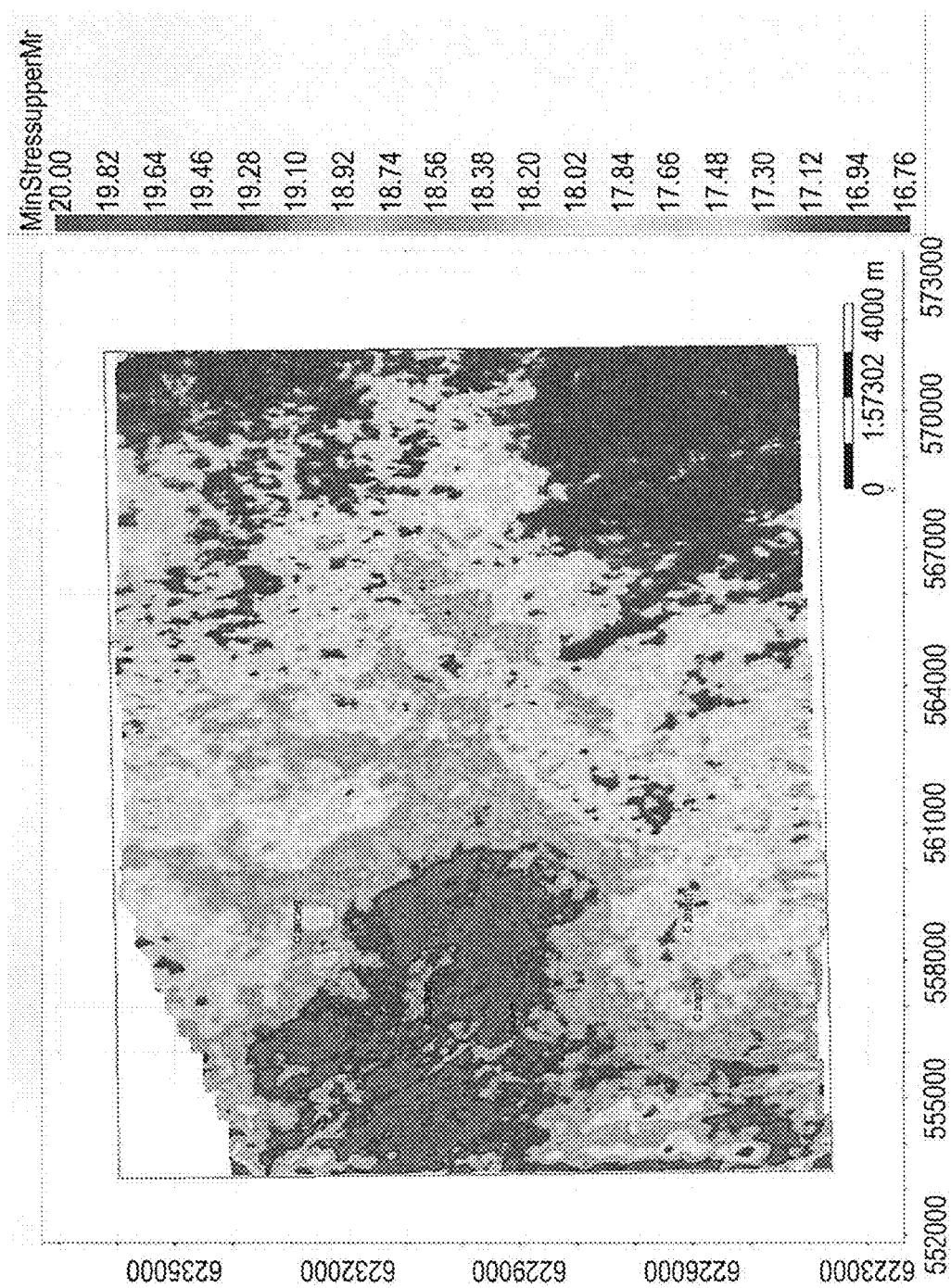
FIG. 2 shows a stress map of the minimum horizontal stress obtained according to one aspect of the present invention.
Figure 2B:
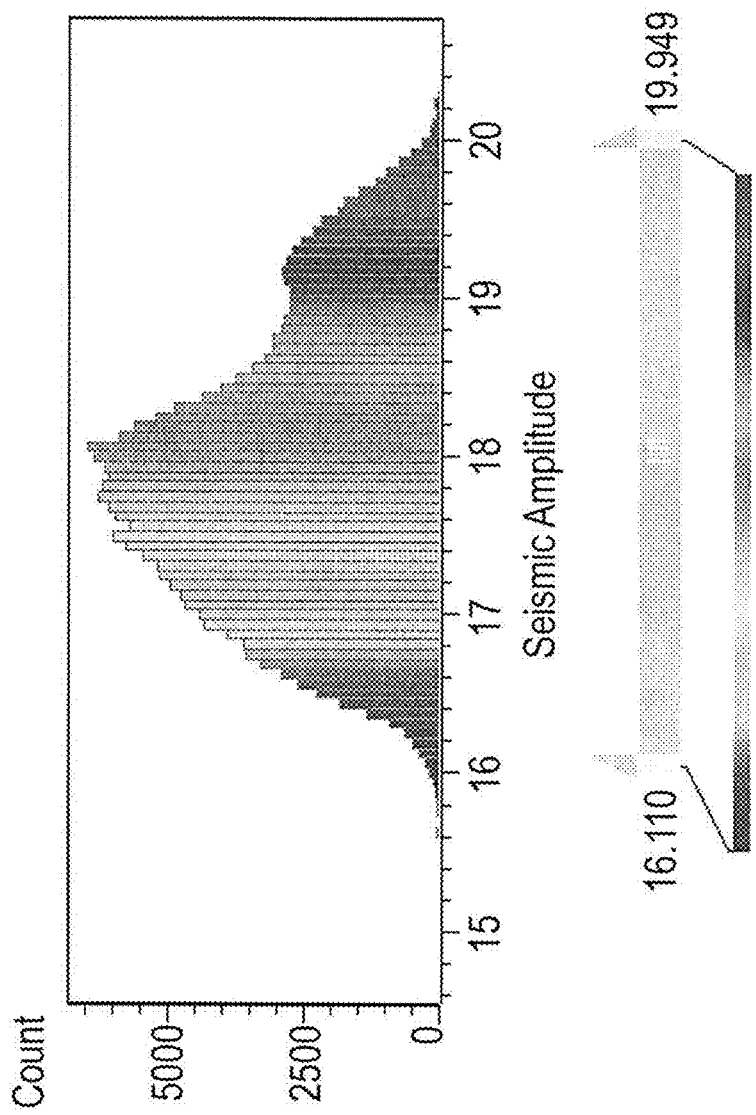
Figure 3A:
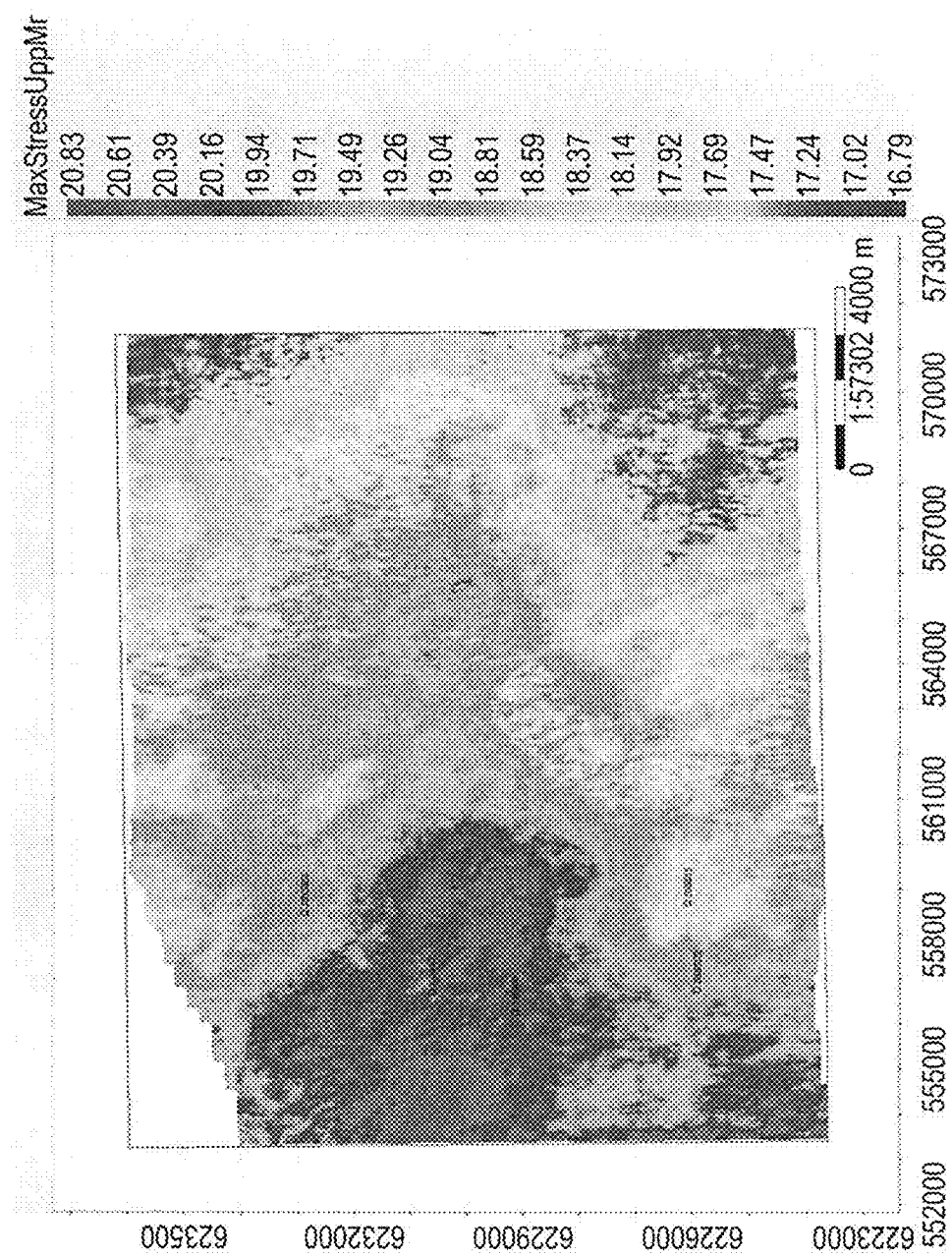
FIG. 3 shows a stress map of the maximum horizontal stress obtained according to one aspect of the present invention.
Figure 3B:
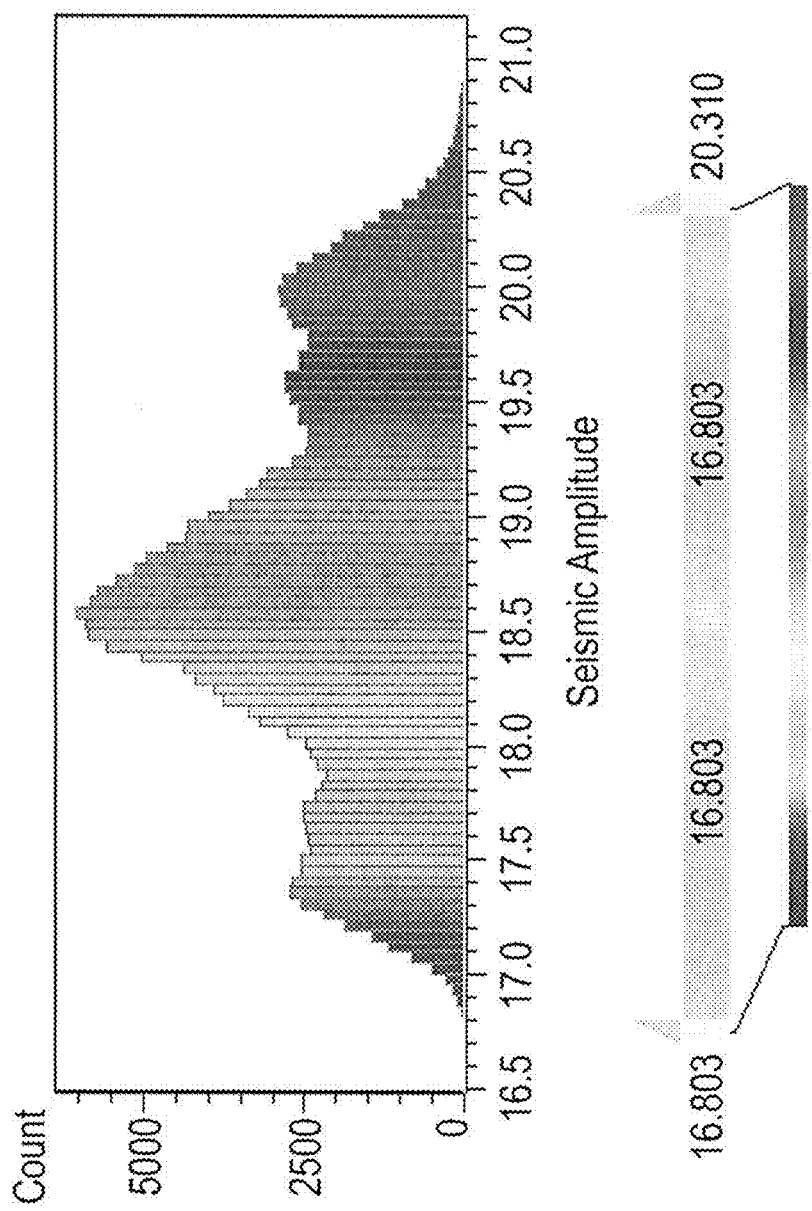

From equations (26) and (27), the minimum horizontal stress $\sigma_x$ and the maximum horizontal stress $\sigma_y$ can be estimated because the vertical stress $\sigma_z$ can be estimated from either seismic data or well logs, and the other parameters can be acquired from either birefringence analysis of multicomponent, 3D seismic data or using azimuthal velocity and azimuthal AVO inversion of conventional 3D seismic data. Referring to FIG. 2, an illustration of the minimum horizontal stress map obtained according to one aspect of the present invention is shown. Referring to FIG. 3, a stress map of the maximum horizontal stress obtained according to one aspect of the present invention is shown.

In the preferred embodiment of the present invention, density is estimated from simultaneous or joint AVO inversion of prestack seismic data, which is described below. In other embodiments, the density may be obtained by azimuthal simultaneous elastic inversion, as disclosed by U.S. Application Nos. 61/313,394 and 61/340,096, entitled METHODS AND SYSTEMS FOR PERFORMING AZIMUTHAL SIMULTANEOUS ELASTIC INVERSION.

Preferably, vertical stress, $\sigma_v$ or $\sigma_z$ can be estimated by integrating a density log in kg/m$^3$, which has been derived from seismic inversion. Integration changes the units to kg/m$^2$, then multiplication by gravity, g≈9.8 m/s$^2$, converts these to Pascals (kg/ms$^2$). Division by one million converts to MegaPascals (MPa). Thus, vertical stress can be represented as $$\sigma_v(z) = \int_0^z g\rho(h)d(h) \quad (28)$$

where z: depth g: gravity≈9.8 m/s$^2$ $\rho(h)$: density at depth h $\sigma_v(z)$: vertical stress at depth z Equation (28) is then approximated by a summation over depth as follows $$\overline{\rho}(i) = \overline{\rho}(i-1)z(i-1) + \frac{z(i) - z(i-1)}{z(i)}\rho(i) \quad (29)$$

so $$\sigma_v(i) = gz(i)\overline{\rho}(i) \quad (30)$$

Therefore, combining equations (29) and (30) and assuming that the first density value in the log, or derived from the seismic data, is the density to the surface, the vertical stress can be represented as $$\sigma_v(i) = \sigma_v(i-1)z(i) + g(z(i)-z(i-1))\rho(i) \quad (31)$$

where $\overline{\rho}(i)$: average density at depth step i

The preferred embodiment of the invention also provides for a simple method to estimate the vertical stress from seismic data in time. Equation (28) can be approximated as $$\sigma_v(z) \approx \sum_{h=0}^{z} g\rho(h)\Delta h \tag{32}$$

and the depth-step $\Delta h$ is approximated by $$\Delta h \approx \frac{V_p \Delta t}{2}$$

because seismic time is two-way time and the seismic velocity is average velocity over that depth step
where
z: depth
g: gravity$\approx$9.8 m/s$^2$
$\rho(h)$: density at depth h
$\sigma_v(z)$: vertical stress at depth z
$V_p$: seismic velocity in m/s
$\Delta t$: seismic two-way time in seconds Further, in the preferred embodiment, differential stress, $(\sigma_x - \sigma_y)$, can now be calculated from seismic data using (26) and (27) and the vertical stress obtained from either equation (31) or (32). Therefore, the differential stress can be represented as $$\sigma_x - \sigma_y = \sigma_z v \left( \frac{1+v}{1+EZ_N - v^2} - \frac{1+EZ_N+v}{1+EZ_N - v^2} \right) \tag{33}$$

$$= \sigma_z \frac{-vEZ_N}{1+EZ_N - v^2}$$

Further, in the preferred embodiment, the differential ratio of the maximum and minimum horizontal stresses or the Differential Horizontal Stress Ration, DHSR, based on equations (26) and (27), can be represented as $$\frac{\sigma_{Hmax} - \sigma_{hmin}}{\sigma_{Hmax}} = \frac{\sigma_y - \sigma_x}{\sigma_y} = \frac{EZ_N}{1+EZ_N+v} \tag{34}$$

The value of DHSR correlates with how and if the formation will fracture because lower DHSR values indicate areas where the rock will have a greater tendency to fracture in the network. Also, higher values of Young's Modulus indicate areas of the formation that are more brittle. Therefore, areas that are optimal for hydraulic fracturing would have high Young's Modulus values and low DHSR values. It is envisioned that in other embodiments, the DHSR value can fall between broader ranges, depending on the application. In the preferred embodiment, this term should fall between 0.00 and 0.05. That is $$0.00 \leq \frac{\sigma_{Hmax} - \sigma_{hmin}}{\sigma_{Hmax}} = \frac{EZ_N}{1+EZ_N+v} \leq 0.05 \tag{35}$$

Figure 4:
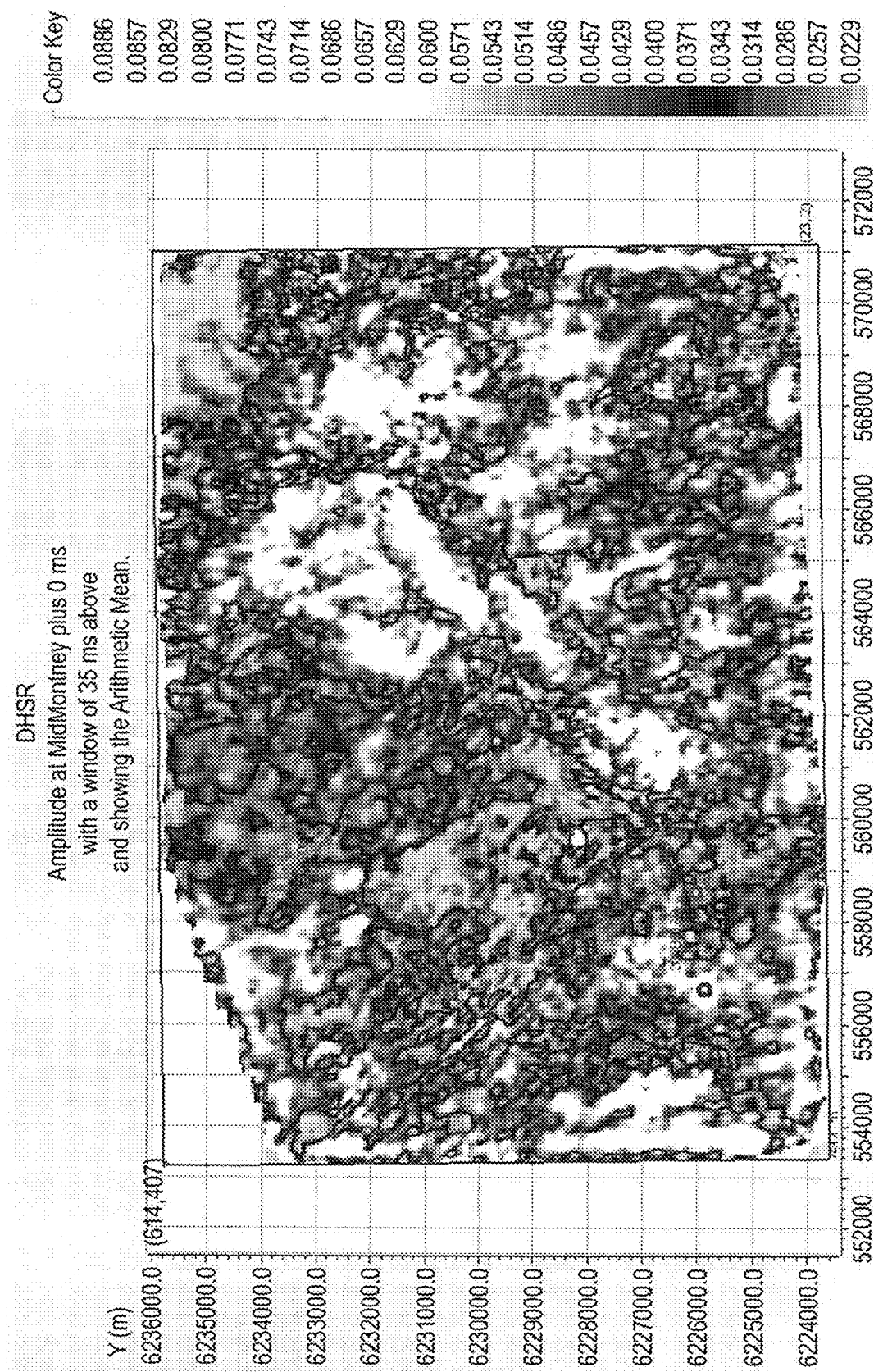
FIG. 4 shows Differential Horizontal Stress Ratio (DHSR) slices obtained according to one aspect of the present invention.
Figure 5:
FIG. 5 shows Young's Modulus with the differential horizontal stress as platelets.

Referring to FIG. 4, a Differential Horizontal Stress Ratio (DHSR) slice obtained according to one aspect of the present invention is shown. Referring to FIG. 5, Young's Modulus with the differential horizontal stress as platelets is shown where the direction of the platelet shows the direction of the maximum horizontal stress, and the size of the platelet shows the differential horizontal stress ration.

In another embodiment, a tectonic strain term, $\epsilon_{tect}$, is introduced to allow for calibration of the horizontal stresses derived in equations (27) and (28) to a known reference point. In various basins around the world, the maximum horizontal stress is greater than the vertical stress. The relationship between the horizontal stress and the vertical stress represented by equations (27) and (28), however, does not closely reflect this nature of these basins because the horizontal stress in these equations is not greater than the vertical stress. As such, the second embodiment of the invention introduces a tectonic stress term to resolve this by shifting the maximum and minimum horizontal stress by a defined amount.

In this embodiment, the tectonic effect is applied by imposing a constant, continuous, horizontal strain across different zones, as disclosed by Blanton, T. L. and Olson, J. E., 1999, "Stress Magnitudes from Logs: Effects of Tectonic Strains and Temperature" SPE Reservoir Eval. & Eng. 2(1), pp. 62-68 (hereinafter "Blanton and Olson") rather than a constant stress, which requires different strains across different zones. Blanton and Olson provides a method of calibrating in-situ stress logs by including the effects of temperature and tectonics and outputs of minimum and maximum horizontal stress magnitudes. The equations derived by Blanton and Olson are adapted for calibrating the horizontal stresses estimated by the present invention. Further, the thermoelastic strain term is omitted. Under these assumptions and disclosures by Blanton and Olson, if the tectonic strain is extensional (negative: $\epsilon_{tect}$<0), the equations for minimum and maximum horizontal stresses are given by:

$$\sigma_{hmin} = C_1 \epsilon_{tect} + C_2 \tag{36}$$
and
$$\sigma_{Hmax} = vC_1 \epsilon_{tect} + C_2 \tag{37}$$
thus
$$\epsilon_{tect} = \frac{\sigma'_{hmin} - C'_2}{C'_1} \tag{38}$$

If the tectonic strain is compressive (positive: $\epsilon_{tect}$>0), the equations for minimum and maximum horizontal stresses are given by:

$$\sigma_{hmin} = vC_1 \epsilon_{tect} + C_2 \tag{39}$$
and
$$\sigma_{Hmax} = C_1 \epsilon_{tect} + C_2 \tag{40}$$
thus
$$\epsilon_{tect} = \frac{\sigma'_{hmin} - C'_2}{vC'_1} \tag{41}$$

For both extensional and compressive tectonic strains, the parameters are defined as $$C_1 = \frac{E}{1-v^2}$$

$$C_2 = \frac{v\sigma_v + (1-2v)\alpha P}{1-v}$$

α: the Biot poroelastic constant
P: pore pressure
v: Poisson's ratio

The primes in equations (38) and (41) indicate that these terms are associated with the particular depth at which the minimum horizontal stress has been measured. As such, the values are provided by the minimum horizontal stress measurements at or near the target depth.

In this embodiment, to define the constant to shift $\sigma_{hmin}$ and $\sigma_{Hmax}$ so the horizontal stresses can be greater than the vertical stress $\sigma_v$, the calculation will be done at the depth at which $\sigma'_{hmin}$ is estimated and applied to all depths. According to Blanton and Olson, the tectonic stress, $\sigma_{tect}$, can be written as $$\sigma_{tect}(z) = \frac{1-v^2(z)}{E(z)}\epsilon_{tect} \quad (42)$$

Now that the tectonic stress is defined, it can be added to the equation frequently used to calculate stresses from logs $$\sigma_{hmin} = \frac{v}{1-v}(\sigma_v - \alpha P) + \alpha P \quad (43)$$

to give the following equation $$\sigma_{hmin}(z) = \frac{v(z)}{1-v(z)}[\sigma_v(z) - \alpha P(z)] + \alpha P(z) + \sigma_{tect}(z) \quad (44)$$

Therefore, equations (43) and (44) allow for calibration of the horizontal stresses to a known depth, z, using the tectonic strain, $\epsilon_{tect}$, calculated at the depth at which $\sigma'_{hmin}$ is estimated. Once the tectonic strain term, $\epsilon_{tect}$, is estimated, the more rapidly varying tectonic stress can be estimated from equation (42). The tectonic stress $\sigma_{tect}$ from equation (42) can be added to the stresses at all depths estimated from equations (26) and (27). The addition of the tectonic stress $\sigma_{tect}$ calibrates the calculated estimates of the minimum horizontal stress and the maximum horizontal stress to the known stresses and/or strains at specific locations. Furthermore, the present invention can be implemented to use a slowly varying tectonic strain term, $\epsilon_{tect}(x,y,z)$, which allows for some gradual variations of tectonic strain with depth and location. That is, the horizontal stress of equations (26) and (27) are calibrated to a horizontal stress versus depth curve derived for the desired basin using a modified tectonic strain method of Blanton and Olson that is applicable to seismic information. Alternatively, the horizontal stress estimates of equations (26) and (27) can be calibrated to a stress curve estimated from well logs.

In another embodiment, instead of calibrating the stress compliance tensor, it includes the tectonic strain for a more reliable model of formations where the horizontal stress is greater than the vertical stress. The implication being that if tectonic strain is required, then the rocks of certain formations are moving. In addition, the method of this embodiment also considers whether there is additional overburden stress, such as that responsible for isostatic rebound due to earlier glaciations and removal of overburden by erosion processes. Overburden stress has a minor additive impact on the vertical stress, which in turn, as seen above, affects the horizontal stress estimates.

The method of this embodiment begins with equation (8), which is the matrix of equation (2) representing Hooke's law that includes the compliance tensor. As discussed above, it is assumed that if there is tectonic strain, it will be a near-constant value for $\epsilon_y = \epsilon_2 = \epsilon_{tect}$. If there is additional overburden stress, then there will also be an additional constant stress $\sigma_{ob}$. As such, the vertical stress will be $\sigma_3 + \sigma_{ob}$.

$$\begin{bmatrix} 0 \\ \epsilon_{tect} \\ 0 \\ 0 \\ 0 \\ 0 \end{bmatrix} = \begin{bmatrix} \frac{1}{E}+Z_N & -\frac{v}{E} & -\frac{v}{E} & 0 & 0 & 0 \\ -\frac{v}{E} & \frac{1}{E} & -\frac{v}{E} & 0 & 0 & 0 \\ -\frac{v}{E} & -\frac{v}{E} & \frac{1}{E} & 0 & 0 & 0 \\ 0 & 0 & 0 & \frac{1}{\mu} & 0 & 0 \\ 0 & 0 & 0 & 0 & \frac{1}{\mu}+Z_T & 0 \\ 0 & 0 & 0 & 0 & 0 & \frac{1}{\mu}+Z_T \end{bmatrix} \begin{bmatrix} \sigma_1 \\ \sigma_2 \\ \sigma_z+\sigma_{ob} \\ \sigma_4 \\ \sigma_5 \\ \sigma_6 \end{bmatrix} \quad (45)$$

Similar to the calculations done for equation (14) and under the same assumptions of Iverson, the strains $\epsilon_i$ can be calculated from the matrix (45). For instance, the horizontal strains can be written as $$\epsilon_x = \epsilon_1 = 0 = \left(\frac{1}{E}+Z_N\right)\sigma_x - \frac{v}{E}(\sigma_y + \sigma_z + \sigma_{ob}) \quad (46)$$

and $$\epsilon_y = \epsilon_2 = \epsilon_{tect} = \frac{1}{E}\sigma_y - \frac{v}{E}(\sigma_x + \sigma_z + \sigma_{ob}) \quad (47)$$

Also the estimation of vertical stress will include the additional overburden stress. As such, the vertical estimation of equation (28) can be written as $$\sigma_z(z) = \int_\sigma^z g\rho(h)dh + \sigma_{ob} \quad (48)$$

Solving for $\sigma_y$ in equation (46) gives $$\sigma_y = \left[\frac{1+EZ_N}{v}\right]\sigma_x - (\sigma_z + \sigma_{ob}) \quad (49)$$

Solving for $\sigma_y$ from equation (47) gives $$\sigma_y = E\epsilon_{tect} + v(\sigma_x + \sigma_z + \sigma_{ob}) \quad (50)$$

Substituting $\sigma_y$ from equation (50) into equation (46) gives $$0 = \left(\frac{1}{E}+Z_N\right)\sigma_x - \frac{v}{E}[E\epsilon_{tect} + v(\sigma_x + \sigma_z + \sigma_{ob}) + \sigma_z + \sigma_{ob}] \quad (51)$$

Now solving for $\sigma_x$ in equation (51) gives $$\sigma_x = \frac{v[E\epsilon_{tect} + (1+v)(\sigma_z + \sigma_{ob})]}{1+EZ_N - v^2} \quad (52)$$

Substituting $\sigma_x$ from equation (52) into equation (50) gives $$\sigma_y = E\varepsilon_{tect} + \nu\left(\frac{\nu[E\varepsilon_{tect} + (1+\nu)(\sigma_z + \sigma_{ob})]}{1 + EZ_N - \nu^2} + \sigma_z + \sigma_{ob}\right) \quad (53)$$

Solving for $\sigma_y$ in equation (53) gives $$\sigma_y = \frac{(1 + EZ_N)E\varepsilon_{tect} + \nu(1 + EZ_N + \nu)(\sigma_z + \sigma_{ob})}{1 + EZ_N - \nu^2} \quad (54)$$

As can be seen, equations (52) and (54) represent the minimum horizontal stress $\sigma_x$ and the maximum horizontal stress $\sigma_y$, where the tectonic strain is also included in the estimation. Now, the minimum and maximum horizontal stresses can be estimated for basins where the horizontal stress is greater than the vertical stress using the vertical stress, $\sigma_z$, obtained from either seismic data or well logs. As discussed above, other parameters in equations (52) and (54) can be acquired from either birefringence analysis of multi-component, 3D seismic data or using azimuthal velocity and azimuthal AVO inversion of conventional 3D seismic data. In the preferred embodiment of the present invention, density for use in determining the vertical stress is estimated from simultaneous or joint AVO inversion of prestack seismic data, which is described above. In other embodiments, the density may be obtained by azimuthal simultaneous elastic inversion, as disclosed by U.S. Application Nos. 61/313,394 and 61/340,096, entitled METHODS AND SYSTEMS FOR PERFORMING AZIMUTHAL SIMULTANEOUS ELASTIC INVERSION and filed on Mar. 12, 2010, the disclosures of which are incorporated by reference.

Once the equations for the minimum and maximum horizontal stresses are known, the DHSR can be calculated as $$\frac{\sigma_y - \sigma_x}{\sigma_y} = \frac{(1 + EZ_N - \nu)E\varepsilon_{tect} + \nu EZ_N(\sigma_z + \sigma_{ob})}{(1 + EZ_N)E\varepsilon_{tect} + \nu(1 + EZ_N + \nu)(\sigma_z + \sigma_{ob})} \quad (55)$$

As discussed above, this term should be small for optimal zones for hydraulic fracturing. Preferably, the range should be between 0.00 and 0.05. It is also envisioned, however, that the DHSR can fall between a broader range, depending on the application. In addition, the overburden constant, $\sigma_{ob}$, can be obtained from estimations of various factors such as the amount of moisture falling on particular ice sheets, thickness of ice sheets, and density of glacier ice or other estimates of removal of overburden, for example, erosion. Other embodiments may use other means known in art or other factors known in the art to estimate the overburden constant. Because the embodiments of the present invention provides for accurate estimations of the principal stresses, knowing the direction of these stresses help in evaluating the wellbore stability and fracturing of the formation during drilling, thereby reducing any financial loss due to inaccurate modeling of the fracture networks of the subterranean formation. Moreover, having an accurate estimation of the principal stresses can also reduce problems potentially caused by significant variations in the directions of the principal stresses over a small area. For instance, the results from one embodiment of the present invention that uses seismic data of a formation can provide an accurate estimate showing that most of the formation will fracture with parallel fractures. Accordingly, it is important in hydrocarbon recovery operations to direct horizontal wells in that formation to be fractured as nearly perpendicular to the fracture direction as is reasonable.

Figure 6:
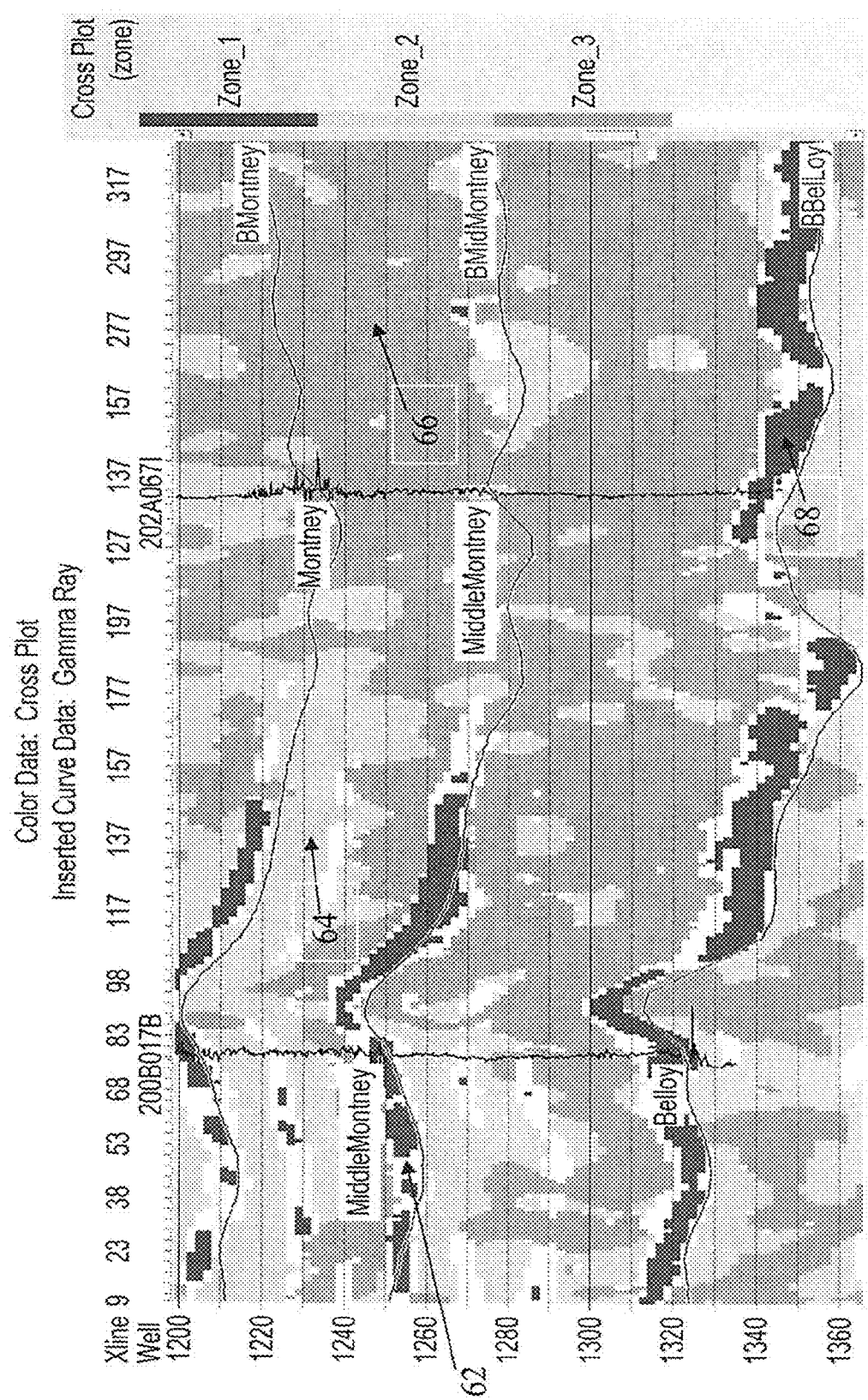
FIG. 6 shows an exemplary hydraulic fracture optimization obtained according to one aspect of the present invention.

Referring to FIG. 6, an exemplary hydraulic fracture optimization obtained according to one aspect of the present invention is shown. In FIG. 6, the areas around region 66 and other regions with similar or the same shade indicate zones where hydraulic fractures will be optimal. The areas around region 64 and other regions with similar or the same shade indicate zones where aligned fractures are more likely to occur. The areas around regions 62 and 68 and other regions with similar or the same shade indicate zones where hydraulic fracturing is unlikely successful because the rock in those zones are too ductile.

In yet another embodiment, hoop stress is incorporated into the estimates of the principal stresses to estimate the pressure required to initiate a fracture on sides of a vertical borehole paralleling the maximum and minimum horizontal stresses. This embodiment also provides for estimating the pressures required to initiate a fracture on the top of and the side of a horizontal borehole. The fracture initiation pressure is added to the side of a vertical borehole from hoop stress estimation around the vertical borehole, which can be estimated as $3\sigma_{hmin} - \sigma_{Hmax}$. In the following example of this embodiment, there is only one fracture initiation pressure, which is on the side of the borehole in the direction of minimum horizontal stress. Therefore, the method of this embodiment is extendable to a borehole of arbitrary orientation.

Generally, if a circular hole is made in a homogeneous body experiencing a homogeneous stress field, stress will concentrate around the hole since no force can be carried through the interior void. This concept would generally applied even if the hole is filled with other material of differing elastic moduli. Bjorn Lund has evaluated the stresses around the borehole wall, where the stresses referred to below, $\sigma_{ij}$, where $i,j=1,2$, are stresses in a borehole local Cartesian coordinate system where the z-axis lies along the borehole axis, the x-axis is in the plane perpendicular to the borehole axis directed towards the bottom side of the borehole and the y-axis is in the same plane but perpendicular to x. The information is publicly available through various sources, e.g., it can be found at http://www.geofys.uu.se/bl/Avh/node8.html. The cylindrical coordinate system is also local to the borehole with the z-axis parallel to the borehole axis. Bjorn Lund summarized earlier studies of a borehole arbitrarily inclined in the stress field in presented in Hiramatsu, Y. & Oka, Y., 1962, "Stress around a shaft or level excavated in ground with a three-dimensional stress state" Mem. Eng. Fac. Kyoto Univ., 24, pp. 56-76 and Fairhurst, C., 1968, "Methods of determining in situ rock stresses at great depths" Tech Rep TRI-68, Mo. River. Div. Corps of Engl. Therefore, according to Bjorn Lund, $\sigma_{rr} = \Delta P$ $\sigma_{\theta\theta} = \sigma_{11} + \sigma_{22} - 2(\sigma_{11} - \sigma_{22})\cos 2\theta 4\nu\sigma_{12} \sin 2\theta - \Delta P$ $\sigma_{xx} = \sigma_{33} - 2\nu(\sigma_{11} - \sigma_{22})\cos 2\theta - 4\nu\sigma_{12} \sin 2\theta$ $\sigma_{\theta z} = 2(\sigma_{23} \cos \theta - \sigma_{13} \sin \theta)$ \quad (56)

where
- $\theta$: the angle from the x-axis around the borehole wall towards the y-axis
- $\Delta P$: the difference between the fluid pressure in the borehole
- $\nu$: Poisson's ratio
- $\sigma_{zz}$: longitudinal stress along the borehole axis
- $\sigma_{\theta\theta}$: the hoop stress The principal stresses in a horizontal well are the stress atop the borehole and the stress at 90° to that. It is assumed that the wells are drilled horizontally in the direction of minimum horizontal stress, $\sigma_{hmin}$, in the expectation that fractures will follow the path of maximum horizontal stress, $\sigma_{Hmax}$, and therefore be optimized for fracture length perpendicular to this borehole orientation. Therefore, $\sigma_{11}$ can be equal to vertical stress $\sigma_v$ or maximum horizontal stress $\sigma_{Hmax}$. Here, it is assumed $\sigma_{11}=\sigma_{Hmax}$. Similarly, $\sigma_{22}$ can be equal to vertical stress $\sigma_v$ or maximum horizontal stress $\sigma_{Hmax}$ $\sigma_{Hmax}$ or $\sigma_v$. Here, it is assumed $\sigma_{22}=\sigma_v$. Also, in this embodiment, $\sigma_{33}$=the minimum horizontal stress $\sigma_{hmin}$.

At the top of the horizontal wellbore, the angle from the x-axis around the borehole wall towards the y-axis is zero: $\theta=0°$; thus, $\sin 0°=0$ and $\cos 0°=1$, and the hoop stress at the top, $\sigma_{\theta\theta}(0°)$, is the vertical fracture initiation pressure. Using these values, the equations of (56) becomes $$\tau_{\theta\theta}(0°)=\sigma_H+\sigma_v-2(\sigma_H-\sigma_v)-\Delta P=3\sigma_v-\sigma_H-\Delta P \quad (57)$$

$$\sigma_{zz}(0°)=\sigma_h-2\nu(\sigma_H-\sigma_v) \quad (58)$$

$$\sigma_{\theta z}(0°)=0 \quad (59)$$

Paralleling the side of the horizontal wellbore, the angle $\theta$ is 90°:$\theta=90°$; thus, $\sin 2*90°=0$, and $\cos 2*90°=-1$. Here, the hoop stress at 90° is the horizontal fracture initiation pressure. Applying these values, the equations of (56) becomes $$\sigma_{\theta\theta}(90°)=\sigma_H+\sigma_v+2(\sigma_H-\sigma_v)-\Delta P=3\sigma_H-\sigma_v-\Delta P \quad (60)$$

$$\sigma_{zz}(90°)=\sigma_h+2\nu(\sigma_H-\sigma_v) \quad (61)$$

$$\sigma_{\theta z}(90°)=0 \quad (62)$$

It is assumed that the difference between the fluid pressure in the borehole is 0 when borehole pressure is equal to formation pressure: $\Delta P=0$. As such, the fracture initiation pressure $P_{fi}$ is the minimum of the vertical and horizontal fracture initiation pressures, i.e., $P_{fi}=\min\{\sigma_{\theta\theta}(0°), \sigma_{\theta\theta}(90°)\}$. Because the input values of vertical stress, $\sigma_v$, and maximum horizontal stress, $\sigma_{Hmax}$, can be estimated by the previously disclosed embodiments of this invention, equations (57) and (60) can be used to estimate the hoop stress of these Fracture Initiation Pressures between the wells from these seismic estimates. In formations where there are pre-existing fractures, fracturing the formation requires exceeding only the hoop stress. Accordingly, the hoop stress estimate is the Fracture Initiation Pressure for these formations. In other cases where the Fracture Initiation Pressure also includes a tensile term that must be exceeded to fracture the formation, the hoop stress may be estimated as discussed above while the tensile strength of the rock can be calculated from uniaxial and triaxial core stress tests.

Being able to estimate the Fracture Initiation Pressures is important because the Fracture Initiation Pressures provide an excellent means of calibrating and validating the measurements derived from the seismic data because these pressures are available immediately upon fracture of the rock under hydraulic pressure. Whereas, calibration of the closure stress, or minimum horizontal stress, requires more time for the fluids under pressure to reach the formation. Once the Fracture Initiation Pressure and closure pressures are calibrated, then the maximum horizontal stress is calibrated as well. The present disclosure provides methods and systems for estimating stresses and important rock properties for various formations, such as Shale Gas, Tight Gas, Heavy Oil, Shale Oil, Coal Bed Methane (CBM), and any formation that requires hydraulic fracturing, from specific inputs. The inputs include $\rho$—density, $V_p$—seismic velocity in m/s, $V_s$—seismic S-wave velocity in m/s, $\Delta_N$—normal weakness and stress (fracture) direction can be calculated from azimuthal simultaneous elastic inversion, as discussed above, azimuthal AVO, or azimuthal velocity analysis; borehole azimuth and dip, $\Delta t$—sample rate in seconds, $\Delta P$—the difference between the fluid pressure in the borehole, $P_b$, and the formation pore pressure, $P_0$, assuming $\Delta P=0$ unless there is additional information. The outputs from embodiments of the present disclosure include $\mu$—Shear modulus, E—Young's modulus, $\nu$—Poisson's ratio, $\lambda$—Lamé's modulus, $\sigma_v=\sigma_z$—Vertical stress, $\sigma_{hmin}=\sigma_x$—Minimum horizontal stress (or closure stress), $\sigma_{Hmax}=\sigma_y$—Maximum horizontal stress, and $P_{FB}=\sigma_{\theta\theta}$—Fracture Breakdown Pressure (or Hoop Stress).

In particular, with respect to the stress (fracture) direction calculation, the maximum horizontal stress reorients itself so it is aligned with the symmetry of the anisotropy. Accordingly, the symmetry plane of the anisotropy can be estimated using the azimuthal simultaneous elastic inversion, as discussed above, azimuthal AVO, or azimuthal velocity analysis from multi-component data.

The embodiments of the systems of the present invention may include one or more computer systems to implement the various methods of the present invention. One exemplary computer system may include a central processing unit (CPU), which may be any general-purpose CPU. The present invention is not restricted by the architecture of the CPU or other components of the systems of the present invention as long as the CPU and other components support the inventive operations as described herein. The CPU may execute the various logical instructions according to embodiments of the present invention. For example, the CPU may execute the calculation of the principal stresses according to the exemplary operational flows described above.

In addition, the exemplary computer system may also include random access memory (RAM), which may be SRAM, DRAM, SDRAM, or the like. The embodiments may also include read-only memory (ROM) which may be PROM, EPROM, EEPROM, or the like. The RAM and ROM hold user and system data and programs, as is well known in the art.

The exemplary computer system also includes input/output (I/O) adapter, communications adapter, user interface adapter, and display adapter. I/O adapter, user interface adapter, and/or communications adapter may, in certain embodiments, enable a user to interact with the computer system in order to input information and obtain output information that has been processed by the computer system.

The I/O adapter preferably connects to one or more storage device(s), such as one or more of hard drive, compact disc (CD) drive, floppy disk drive, tape drive, etc. to the exemplary computer system. The storage devices may be utilized when the RAM is insufficient for the memory requirements associated with storing data for operations of the elements described above (e.g., clam adjudication system, etc.). The communications adapter is preferably adapted to couple the computer system to a network, which may enable information to be input to and/or output from the computer system via the network (e.g., the Internet or other wide-area network, a local-area network, a public or private switched telephony network, a wireless network, any combination of the foregoing). The user interface adapter couples user input devices, such as keyboard, pointing device, and microphone and/or output devices, such as speaker(s) to the exemplary computer system. The display adapter is driven by the CPU to control the display on the display device to, for example, display the output of the estimation of the principal stresses or graphs incorporating the estimated principal stresses.

It shall be appreciated that the present invention is not limited to the architecture of the exemplary computer system. For example, any suitable processor-based device may be utilized for implementing the various elements described above (e.g., software for presenting the user interfaces, claim adjudication system, etc.), including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for estimating principal stresses of a subterranean formation using a computer system comprising:
   determining, using the computer system, rock strength parameters from seismic data of the formation;
   calculating, using the computer system, anisotropic elastic properties of the formation using at least said determined rock strength parameters; and
   determining, using the computer system, principal stresses of the formation using at least the calculated anisotropic elastic properties and the rock strength parameters of the formation, wherein the principal stresses comprise a vertical stress, a minimum horizontal stress, and a maximum horizontal stress;
   wherein the minimum horizontal stress is determined by a relation $$\sigma_x = \sigma_z \frac{v(1+v)}{1 + EZ_N - v^2}$$

between the vertical stress $\sigma_z$, Young's modulus E, Poisson's ratio v, and normal compliance $Z_N$.

2. The method of claim 1 wherein the vertical stress is determined by integrating a density log derived from seismic inversion.

3. The method of claim 1 wherein the maximum horizontal stress is determined by a relation $$\sigma_y = \sigma_z v \left[ \frac{1 + EZ_N + v}{1 + EZ_N - v^2} \right]$$

between the vertical stress $\sigma_z$, Young's modulus E, Poisson's ratio v, and normal compliance $Z_N$.

4. The method of claim 1 further comprising:
   calculating a differential ratio of the maximum and minimum horizontal stresses to identify one or more optimal areas of a subterranean formation for hydraulic fracturing.

5. The method of claim 1 further comprising:
   calibrating the determined minimum horizontal stress and maximum horizontal stress to a known reference point by adding a tectonic stress constant, wherein the tectonic stress constant is derived from in-situ stress logs of the reference point.

6. The method of claim 1 wherein the determination of the principal stresses includes a tectonic strain term and an overburden stress term.

7. The method of claim 1 further comprising:
   incorporating hoop stress in the determination of the principal stresses to estimate the pressure required to initiate one or more fractures on the sides of a borehole.

8. A system comprising:
   a first calculation logic that is operable to determine rock strength parameters from seismic data of a subterranean formation;
   a second calculation logic that is operable to calculate anisotropic elastic properties of the formation using at least said determined rock strength parameters; and
   a third calculation logic to determine principal stresses of the formation using at least the calculated anisotropic elastic properties and the rock strength parameters of the formation, wherein the principal stresses comprise a vertical stress, a minimum horizontal stress, and a maximum horizontal stress,
   wherein the minimum horizontal stress is determined by a relation $$\sigma_x = \sigma_z \frac{v(1+v)}{1 + EZ_N - v^2}$$

between the vertical stress ohd z, Young's modulus E, Poisson's ratio v, and normal compliance $Z_N$.

9. The system of claim 8 wherein the vertical stress is determined by integrating a density log derived from seismic inversion.

10. The system of claim 8 wherein the maximum horizontal stress is determined by a relation $$\sigma_y = \sigma_z v \left( \frac{1 + EZ_N + v}{1 + EZ_N - v^2} \right)$$

between the vertical stress $\sigma_z$, Young's modulus E, Poisson's ratio v, and normal compliance $Z_N$.

11. The system of claim 8 further comprising:
   a fourth logic to calculate a differential ratio of the maximum and minimum horizontal stresses to identify one or more optimal areas of a subterranean formation for hydraulic fracturing.

12. The system of claim 8 further comprising:
a fourth logic to calibrate the determined minimum horizontal stress and maximum horizontal stress to a known reference point by adding a tectonic stress constant, wherein the tectonic stress constant is derived from in-situ stress logs of the reference point.

13. The system of claim 8 wherein the determination of the principal stresses includes a tectonic strain term and an overburden stress term.

14. The system of claim 8 further comprising:
a fourth logic to incorporate hoop stress in the determination of the principal stresses to estimate the pressure required to initiate one or more fractures on the sides of a borehole.

15. A method for estimating principal stresses of a subterranean formation using a computer system comprising:
determining, using the computer system, rock strength parameters from seismic data of the formation;
calculating, using the computer system, anisotropic elastic properties of the formation using at least said determined rock strength parameters; and
determining, using the computer system, principal stresses of the formation using at least the calculated anisotropic elastic properties and the rock strength parameters of the formation, wherein the principal stresses comprise a vertical stress, a minimum horizontal stress, and a maximum horizontal stress,
wherein the maximum horizontal stress is determined by a relation $$\sigma_y = \sigma_z v \left( \frac{1 + EZ_N + v}{1 + EZ_N - v^2} \right)$$

between the vertical stress $\sigma_z$, Young's modulus E, Poisson's ratio $v$, and normal compliance $Z_N$.

16. A system comprising:
a first calculation logic that is operable to determine rock strength parameters from seismic data of a subterranean formation;
a second calculation logic that is operable to calculate anisotropic elastic properties of the formation using at least said determined rock strength parameters; and
a third calculation logic to determine principal stresses of the formation using at least the calculated anisotropic elastic properties and the rock strength parameters of the formation, wherein the principal stresses comprise a vertical stress, a minimum horizontal stress, and a maximum horizontal stress,
wherein the maximum horizontal stress is determined by a relation $$\sigma_y = \sigma_z v \left[ \frac{1 + EZ_N + v}{1 + EZ_N - v^2} \right]$$

between the vertical stress $\sigma_z$, Young's modulus E, Poisson's ratio $v$, and normal compliance $Z_N$.

* * * * *

UNITED STATES PATENT AND TRADEMARK OFFICE
CERTIFICATE OF CORRECTION

PATENT NO. : 8,619,500 B2
APPLICATION NO. : 13/012110
DATED : December 31, 2013
INVENTOR(S) : Gray Page 1 of 1

It is certified that error appears in the above-identified patent and that said Letters Patent is hereby corrected as shown below:

In the Specification

In Column 3, Lines 11-12, delete " $DHSR = \left(\dfrac{\sigma_{H\,max} - \sigma_{h\,min}}{\sigma_{H\,min}}\right),$ " and insert -- $DHSR = \left(\dfrac{\sigma_{H\,max} - \sigma_{h\,min}}{\sigma_{H\,max}}\right),$ --, therefor.

In Columns 9-10, Line 43, delete " $\lambda(1 - \Delta_N) \quad M(1 - r^2\Delta_N) \quad \lambda(1 - \Delta_N)$ " and insert -- $\lambda(1 - \Delta_N) \quad M(1 - r^2\Delta_N) \quad \lambda(1 - r\Delta_N)$ --, therefor.

In Columns 9-10, Line 44, delete " $\lambda(1 - \Delta_N) \quad \lambda(1 - \Delta_N) \quad M(1 - r^2\Delta_N)$ " and insert -- $\lambda(1 - \Delta_N) \quad \lambda(1 - r\Delta_N) \quad M(1 - r^2\Delta_N)$ --, therefor.

In Column 18, Line 57, delete "$\sigma_{xx}$" and insert -- $\sigma_{zz}$ --, therefor.

In the Claims

In Column 21, Line 54, in Claim 1, delete "stress;" and insert -- stress, --, therefor.

In Column 22, Line 49, in Claim 8, delete "σhd z," and insert -- $\sigma_z$, --, therefor.

Signed and Sealed this
Thirteenth Day of May, 2014

Michelle K. Lee
*Deputy Director of the United States Patent and Trademark Office*